US007684351B2

(12) United States Patent
Vasseur et al.

(10) Patent No.: US 7,684,351 B2
(45) Date of Patent: Mar. 23, 2010

(54) INTER-DOMAIN OPTIMIZATION TRIGGER IN PCE-BASED ENVIRONMENT

(75) Inventors: Jean-Philippe Vasseur, Dunstable, MA (US); David D. Ward, Somerset, WI (US); Muthurajah Sivabalan, Kanata (CA); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 11/052,280

(22) Filed: Feb. 7, 2005

(65) Prior Publication Data

US 2006/0176820 A1    Aug. 10, 2006

(51) Int. Cl.
    *H04L 12/28*    (2006.01)
(52) U.S. Cl. .................. 370/255; 370/395.5; 370/401; 709/226; 709/242
(58) Field of Classification Search ........................ None
    See application file for complete search history.

(56) References Cited

U.S. PATENT DOCUMENTS

| 5,088,032 | A  |    | 2/1992  | Bosack           |         |
|-----------|----|----|---------|------------------|---------|
| 6,351,770 | B1 |    | 2/2002  | Li et al.        |         |
| 6,539,427 | B1 |    | 3/2003  | Natarajan et al. |         |
| 6,577,597 | B1 |    | 6/2003  | Natarajan et al. |         |
| 6,584,502 | B1 |    | 6/2003  | Natarajan et al. |         |
| 6,665,273 | B1 |    | 12/2003 | Goguen et al.    |         |
| 6,778,492 | B2 |    | 8/2004  | Charny et al.    |         |
| 6,822,940 | B1 |    | 11/2004 | Zavalkovsky et al. |       |
| 6,873,616 | B1 | *  | 3/2005  | Fedyk et al.     | 370/357 |
| 6,895,441 | B1 | *  | 5/2005  | Shabtay et al.   | 709/238 |
| 6,985,959 | B1 | *  | 1/2006  | Lee              | 709/238 |
| 6,993,593 | B2 | *  | 1/2006  | Iwata            | 709/238 |
| 7,215,644 | B2 | *  | 5/2007  | Wu et al.        | 370/248 |
| 2002/0143929 | A1 | * | 10/2002 | Maltz et al.   | 709/224 |
| 2003/0208602 | A1 |   | 11/2003 | Bhalla et al.  |         |

(Continued)

OTHER PUBLICATIONS

Zhang, "Requirements for PCE Based Path Computation", Presentation given at IETF—60 San Diego from Aug. 1-6, 2004, slide #7.*

(Continued)

*Primary Examiner*—Steven H Nguyen
*Assistant Examiner*—Jeffrey M Rutkowski
(74) *Attorney, Agent, or Firm*—Cesari and McKenna, LLP

(57) ABSTRACT

A technique triggers optimization of a traffic engineering (TE) label switched path (LSP) that spans multiple domains of a computer network from a head-end node of a local domain to a tail-end node of a remote domain. The technique is based on the detection of an event in the remote domain ("event domain") that could create a more optimal TE-LSP, such as, e.g., restoration of a network element or increased available bandwidth. Specifically, a path computation element (PCE) in the event domain learns of the event and notifies other PCEs of the event through an event notification. These PCEs then flood an event notification to label switched routers (LSRs) in their respective domain. Upon receiving the notification, if an LSR has one or more TE-LSPs (or pending TE-LSPs), it responds to the PCE with an optimization request for the TE-LSPs. The PCE determines whether a particular TE-LSP may benefit from optimization based on the event domain (i.e., whether the TE-LSP uses the event domain), and processes the request accordingly.

22 Claims, 5 Drawing Sheets

U.S. PATENT DOCUMENTS

| | | | |
|---|---|---|---|
| 2005/0025118 A1* | 2/2005 | Hao et al. | 370/351 |
| 2005/0025179 A1 | 2/2005 | McLaggan et al. | |
| 2005/0152284 A1* | 7/2005 | Kotha et al. | 370/254 |
| 2006/0039391 A1* | 2/2006 | Vasseur et al. | 370/409 |
| 2006/0092940 A1* | 5/2006 | Ansari et al. | 370/392 |
| 2006/0098587 A1* | 5/2006 | Vasseur et al. | 370/254 |
| 2007/0019558 A1* | 1/2007 | Vasseur et al. | 370/248 |
| 2007/0189293 A1* | 8/2007 | Yamada et al. | 370/392 |
| 2008/0198741 A1* | 8/2008 | Lichtwald | 370/228 |

OTHER PUBLICATIONS

Pelsser, C.; Uhlig, S.; Bonaventure, O., "On the difficulty of establishing interdomain LSPs," IP Operations and Management, 2004. Proceedings IEEE Workshop on , pp. 134-139, Oct. 11-13, 2004.*

Shaikh et al., "Experience in black-box OSPF measurement", 2001, Internet Measurement Conference, Proceedings of the 1st ACM SIGCOMM Workshop on Internet Measurement, pp. 113-125.*

Alnuweiri, H.M.; Wong, L.Y.K.; Al-Khasib, T., "Performance of new link state advertisement mechanisms in routing protocols with traffic engineering extensions," Communications Magazine, IEEE , vol. 42, No. 5, pp. 151-162, May 2004.*

Norden et al., "Inter-Domain QoS Routing Algorithms", Applied Research Lab of Washington University at St. Louis, all pages.*

Rekhter, Y., RFC 1771, entitled A Border Gateway Protocol 4 (BGP-4), Mar. 1995, pp. 1-54.

U.S. Appl. No. 10/767,574, filed Sep. 18, 2003, Vasseur et al., entitled Computing Inter-Autonomous System MPLS Traffic Engineering LSP Paths.

Vasseur, J. P. et al., OSPF Work Working Group Internet Draft, entitled OSPF MPLS Traffic Engineering Capabilities (draft-vasseur-ospf-te-caps-00.txt), Jul. 2004, pp. 1-14.

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.

Vasseur, J. P. et al., CCAMP WG Internet Draft, entitled Reoptimization of MPLS Traffic Engineering Loosely Routed LSP (draft-vasseur-ccamp-loose-path-reopt-02.txt), Jul. 2004, pp. 1-12.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-28.

Braden,R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (ISIS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999, Section 12.2.4, pp. 317-319.

* cited by examiner

INTER-DOMAIN OPTIMIZATION TRIGGER IN PCE-BASED ENVIRONMENT

BACKGROUND OF THE INVENTION

1. Field of the Invention

The present invention relates to computer networks and more particularly to triggering optimization of inter-domain paths utilizing path computation elements of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of its surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). An example of such a distributed PCE architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol* (*RSVP*), RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Occasionally, a network element (e.g., a node or link) will fail, causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Typically, both IP traffic and any TE-LSPs are redirected to avoid a failure in a manner known to those skilled in the art. Once the network element is restored or a new one is added (an "event"), a new IGP Advertisement is sent to the surrounding domain so the network can potentially redirect the traffic over the more optimal route (i.e., "reoptimize").

In addition, TE-LSPs typically utilize (reserve) an amount of bandwidth. Because of constraints on the TE-LSP (e.g., required bandwidth), the most optimal path may not be available for a particular TE-LSP, such as when the shortest path has been reserved by other TE-LSPs or other reservation means. Rather than traversing the most optimal path, the TE-LSPs in this case may instead traverse the most optimal path available based on the constraints. For example, the TE-LSP may be established over a non-shortest path that satisfies the required bandwidth constraints (a "sub-optimal" path). This sub-optimal TE-LSP would benefit from re-optimization when there is an increase in available bandwidth over a more optimal link that would meet the constraints in the TE-LSP, thus offering a more optimal (shortest) path. There are also occasions when outstanding requests for TE-LSPs may not be satisfied based on constraints within the request (e.g., there are no available paths that meet the constraints). If a head-end node cannot establish a TE-LSP, it may be configured to wait until the network topology supports the constraints (e.g., when an increase in available bandwidth frees the required bandwidth for the TE-LSP). At that time, the head-end node may again request that the TE-LSP be established over a path that satisfies the constraints. Notably, establishing a new TE-LSP and re-optimizing an established TE-LSP are generally referred to herein as "optimizing" a TE-LSP.

In MPLS TE networks, several "triggers" (e.g., a timer or an event-driven trigger) can be used to initiate the optimization of a TE-LSP. The timer-based approach uses a configurable duration of time between optimizations. This approach is generally sub-optimal because too short of a timer (e.g., every second) results in excessive computation, potentially without any positive outcome, while too long of a timer (e.g., one hour) does not allow for optimization of a TE-LSP as quickly as possible. The event-driven trigger attempts to optimize a TE-LSP when the head-end node receives notification of the event, such as through an IGP Advertisement. A combination of both triggers is a useful approach to balance the known advantages and limitations of each type of trigger.

Often, however, a head-end LSR or node has one or more TE-LSPs into a particular domain (e.g., area or level) outside of its own domain (i.e., a remote domain). A known limitation of such inter-domain TE-LSPs lies in the inability to detect events in the remote domain, primarily because of limited network topology information available to the head-end node. Currently, this lack of information has typically required the use of a timer-based trigger for all remote domain TE-LSP optimization. However, a known event-based trigger solution is described in Re-optimization of MPLS Traffic Engineering Loosely Routed LSP (draft-vasseur-ccamp-loose-path-reopt-02.txt) by Vasseur, et al., published July 2004, which is hereby incorporated by reference. As described therein, a node along an established TE-LSP may detect an event in its domain (e.g., the remote domain) and inform the head-end node of the event through extensions to conventional RSVP signaling. The head-end node can then use an event-based trigger to re-optimize the established TE-LSP. Nodes or LSRs that may have requested a TE-LSP that was rejected, however, will not receive any notification that an event has occurred in the remote domain that could possibly benefit the establishment of their rejected TE-LSP. Therefore, there remains a need for an alternative, event-based optimization trigger for interdomain TE-LSPs that is efficiently distributed to all LSRs that may benefit from such an event.

SUMMARY OF THE INVENTION

The present invention is directed to a technique for triggering optimization of a traffic engineering (TE) label switched path (LSP) that spans multiple domains of a computer network from a head-end node of a local domain to a tail-end node of a remote domain. The novel inter-domain TE-LSP optimization triggering technique is based on the detection of an event in the remote domain ("event domain") that could create a more optimal TE-LSP, such as, e.g., restoration of a network element or a configurable amount of increased available bandwidth. Specifically, a path computation element (PCE) in the event domain learns of the event and notifies PCEs for other domains of the event through an event notification. These PCEs then flood an event notification to label switched routers (LSRS) in their respective domains. Upon receiving the notification and determining that it is a head-end node of one or more TE-LSPs (or pending TE-LSPs), the LSR responds to the PCE of its domain by issuing an optimization request for the one or more TE-LSPS. The PCE, in turn, determines whether a particular TE-LSP may benefit from optimization based on the event domain (i.e., whether the TE-LSP passes through or terminates at the event domain), and processes the request accordingly.

In the illustrative embodiment described herein, the event notification is transmitted using IGP messages. Each PCE may create an IGP message that is used to propagate ("advertise") the event notification to other PCEs or LSRs in its domain, e.g., its IGP area/level. The PCE is illustratively embodied as an area border router or a level 1/level 2 router and the IGP message is embodied as an Open Shortest Path First (OSPF) or Intermediate-System-to-Intermediate-System (IS-IS) advertisement message ("IGP Advertisement"), respectively. Notably, the IGP Advertisement includes a type/length/value (TLV) encoded format used to convey the event notification.

In accordance with one aspect of the present invention, a PCE in the event domain ("event PCE") learns of an event through conventional notification means, e.g., the IGP Advertisements. The event may be restoration of a network element, such as a new or restored link, or increased available bandwidth over a link that is determined (configured) to be sufficient to merit an event. Illustratively, the event PCE notifies other PCEs of the event through a novel TLV object, which is illustratively contained within the IGP Advertisement.

In accordance with another aspect of the present invention, a PCE receiving the event notification determines whether the event notification creates an optimization opportunity for LSRs in its domain, and if so, floods event notifications to its domain. If an LSR that receives the notification is a head-end node for one or more TE-LSPs or is otherwise attempting to establish a TE-LSP, the LSR/head-end node sends a conventional re-optimization request or a new path computation request, respectively (generally, an "optimization" request) to the PCE in its domain ("source PCE") for the one or more TE-LSPs. Upon receiving the request for a particular TE-LSP, the source PCE, if configured, determines whether the TE-LSP passes through or terminates at the event domain by comparing the event PCE with the PCE to which the source PCE would forward the optimization request. If the TE-LSP uses the event domain, the PCE processes the request. If, however, the TE-LSP does not use the event domain (i.e., terminates in a different remote domain), the source PCE may reject the request and return an error message.

Advantageously, the novel technique triggers optimization of a TE-LSP that spans multiple domains based on events occurring in remote domains. By informing the head-end node in a source domain of the event (an optimization opportunity) in a remote domain, the inventive technique provides a mechanism for efficiently triggering the request for optimization of a multi-domain TE-LSP when an event occurs that could allow for a more optimal path, as opposed to relying on a sub-optimal timer-based trigger.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
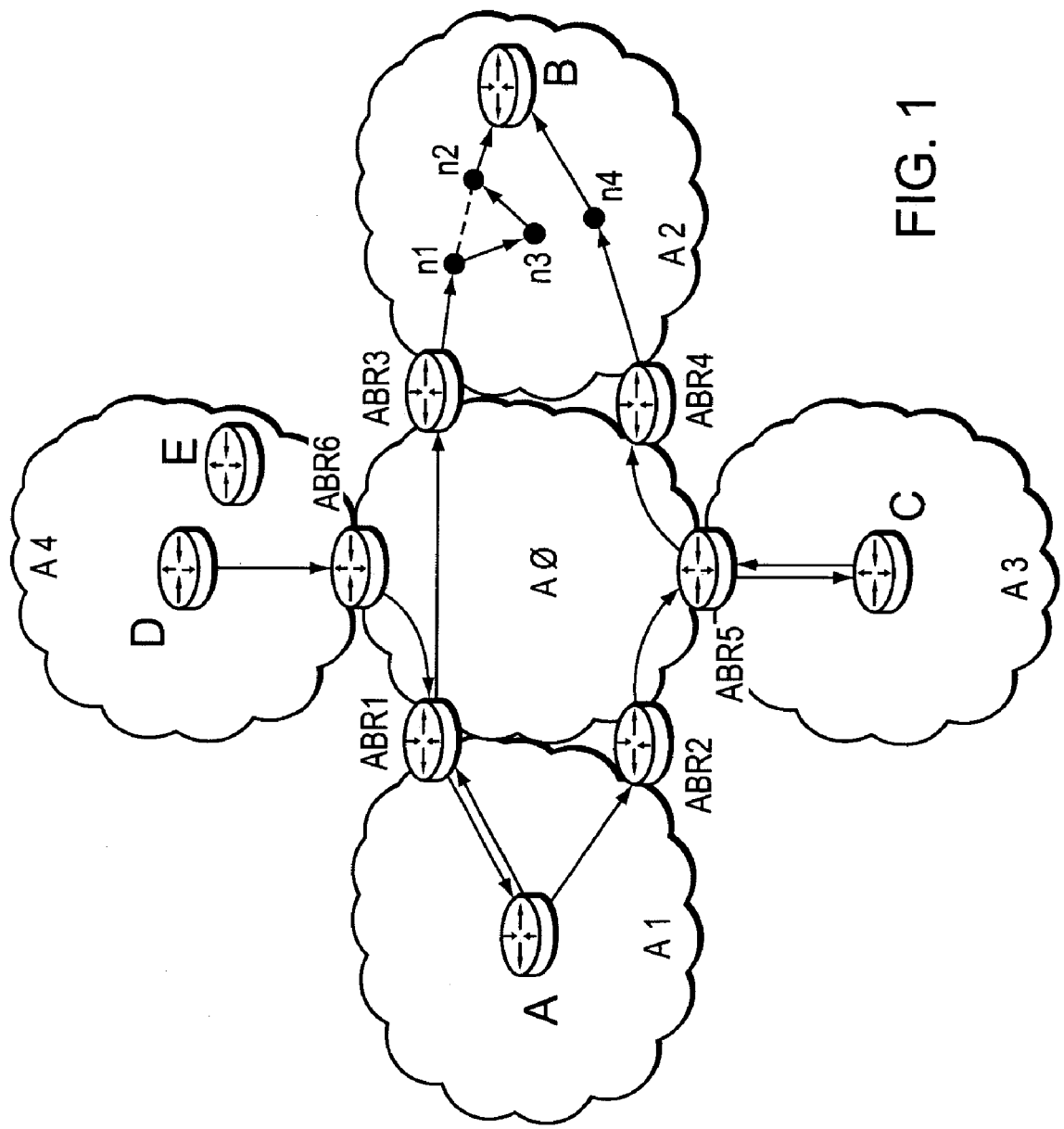
FIG. 1 is a schematic block diagram of an exemplary computer network of areas that may be used in accordance with the present invention.

FIG. 1 is a schematic block diagram of an exemplary computer network 100 comprising areas A1-A4 interconnected by area A0 (a "backbone" area). Area A0 shares area border routers (ABRs) with each area A1-A4, namely, ABR1-2 with A1, ABR3-4 with A2, ABR5 with A3, and ABR6 with A4. In addition, areas A1-A4 share their area border routers ABR1-6 with backbone area A0. Areas A1-A4 have exemplary intradomain routers A-D, respectively, while area A4 also has intradomain router E. Also, within A2 are exemplary nodes (e.g., routers) n1-n4. Those skilled in the art will understand that any number of routers and nodes may be used in the areas, and that the view shown herein is for simplicity. As used herein, an area is a collection of routers that share full network topology information with each other but not necessarily with routers outside the area. A collection of areas may be contained within a single autonomous system (AS). The term area as used herein also encompasses the term "level" which has a similar meaning for networks that employ IS-IS as their interior gateway protocol (IGP), in which case the area border routers ABR1-6 are embodied as level 1/level 2 (L1L2) routers. These examples are merely representative. Areas and levels are generally referred to herein as "domains." Also, the terms ABR, L1L2 router, and more generally, border routers, are used interchangeably herein.

Data packets may be exchanged among the areas A0-A4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the areas using predetermined IGPs, such as conventional distance-vector protocols or, illustratively, link-state protocols, through the use of IGP Advertisements.

Figure 2:
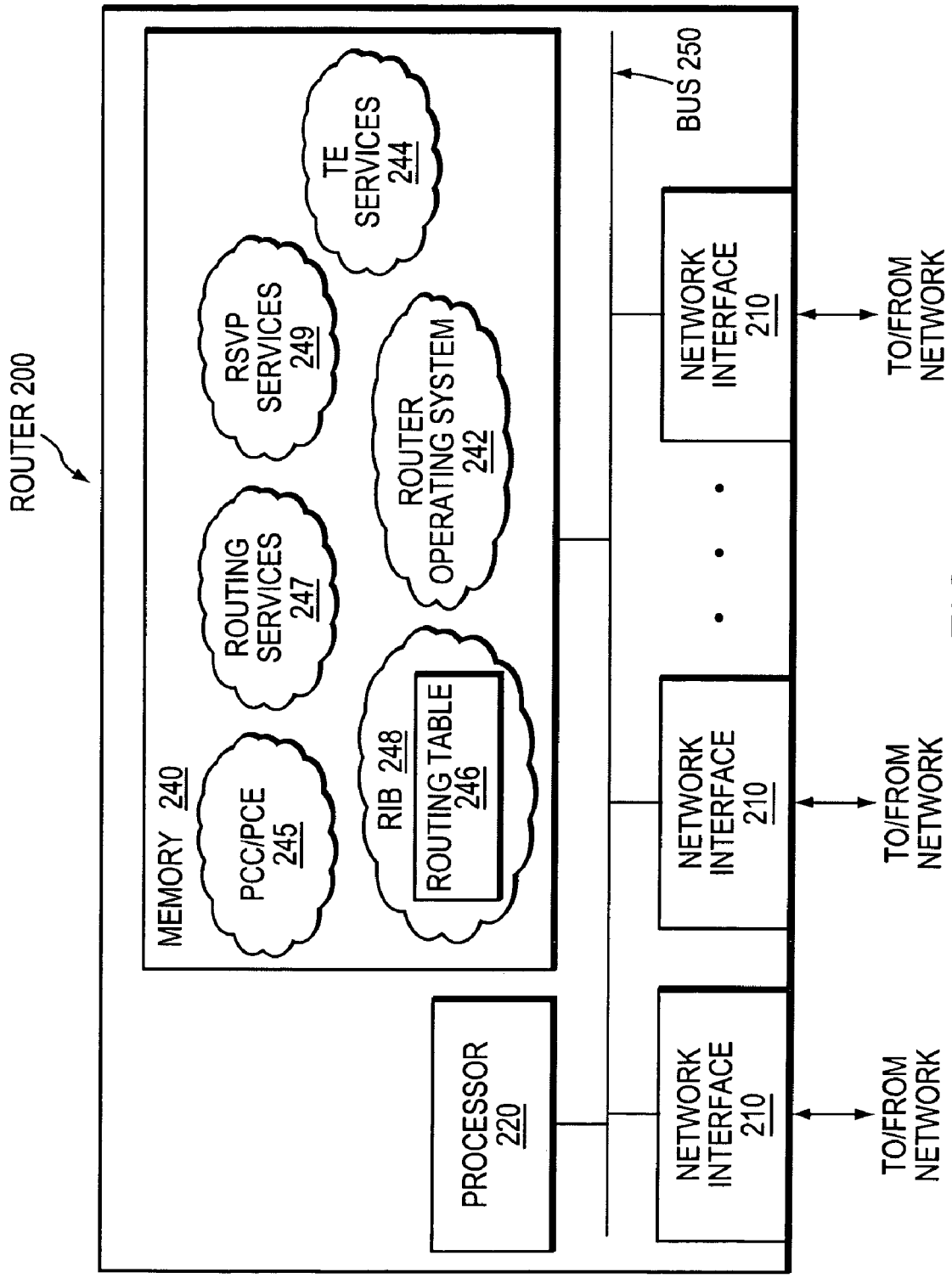
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 246. A router operating system 242, portions of which are typically resident in memory 240 and executed by the processor, functionally organizes the router by, inter alia, invoking network operations in support of software processes and/or services executing on the router. These software processes and/or services include PCC/PCE process 245, routing services 247, Routing Information Base (RIB) 248, TE services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

Routing table 246 is illustratively resident in memory 240 and used to store routing information, including reachable destination address prefixes and associated attributes. These attributes include next-hop information used by router 200 to reach the destination prefixes and an associated metric (e.g., cost) of reaching the destination prefixes. The routing table 246 is illustratively maintained and managed by RIB 248. To that end, the RIB 248 maintains copies of routes (paths) provided by the routing protocols, such as IGP, in order to compute best paths/routes for installation into the routing table 246.

Changes in the network topology may be communicated among routers 200 using a link-state protocol, such as the conventional OSPF and IS-IS protocols. Suppose, for example, that a communication link fails within an AS or a cost value associated with a network node changes. Once the change in the network's state is detected by one of the routers, that router may flood an IGP Advertisement communicating the change to the other routers in the AS. In this manner, each of the routers eventually "converges" to an identical view of the network topology.

Figure 3:
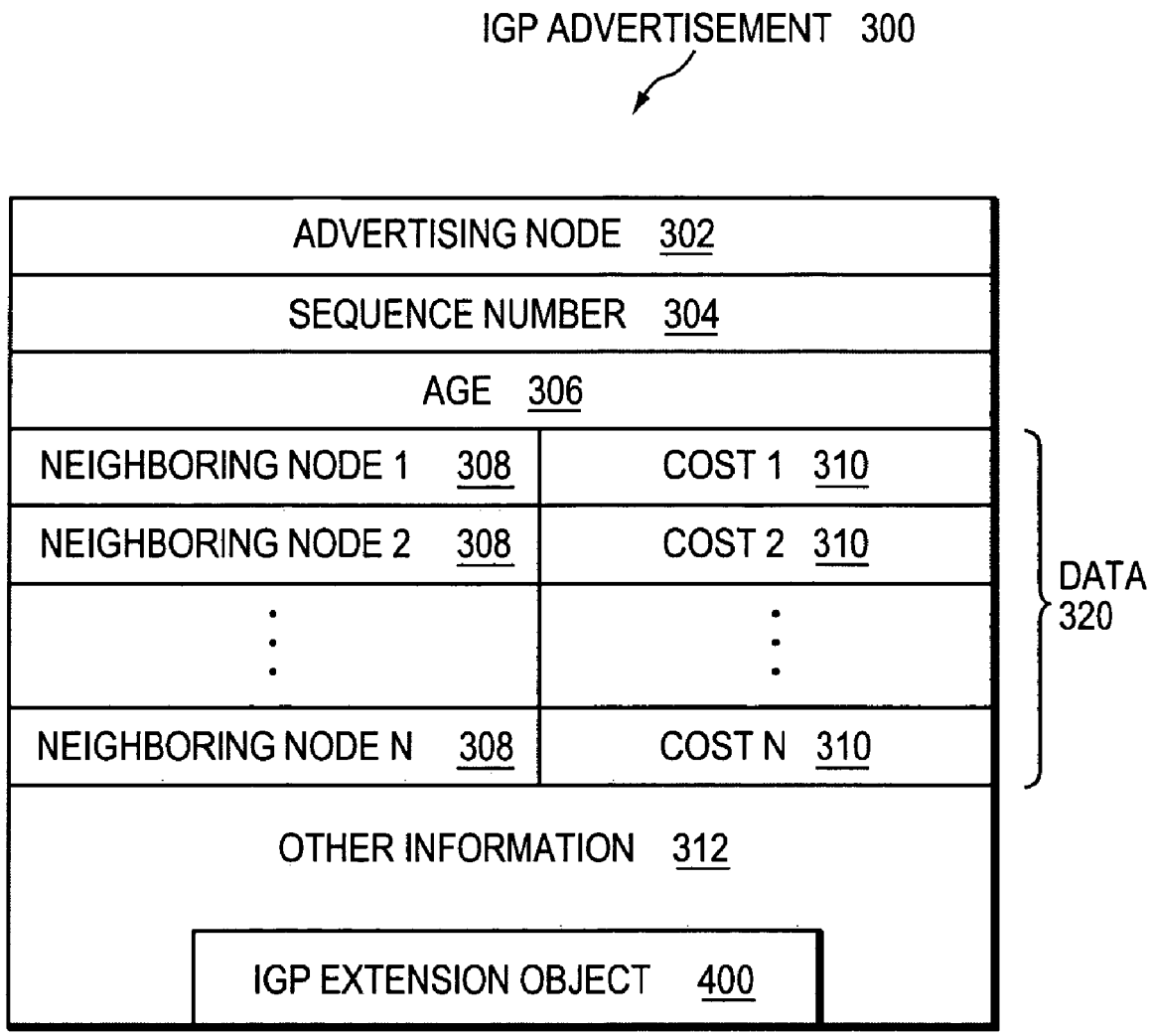
FIG. 3 is a schematic block diagram of an exemplary IGP Advertisement that may be flooded by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an IGP Extension Object 400 (described further below). Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the arrows between a head-end node (A) and a tail-end node (C) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple domains, previously incorporated U.S. Application Ser. No. 10/767,574 describes the use of a virtual shortest path tree (VSPT) algorithm in a distributed path computation element (PCE) architecture where multiple PCEs are involved in the computation of an inter-domain TE-LSP. Notably, it will be apparent to those skilled in the art that other methods may be used to compute the TE-LSPs (e.g., loose hops, explicit paths, etc.), and such methods are within the scope of the present invention.

As an example, assume that all border routers in FIG. 1 (ABR1-6) are PCE enabled border routers. The address of the local PCE may be manually configured. Alternatively, the PCE may advertise itself through flooding within the domain using, e.g., path computation element discovery (PCED) techniques in accordance with OSPF MPLS Traffic Engineering Capabilities (draft-vasseur-ospf-te-caps.txt) by Vasseur, et al., published July 2004, which is hereby incorporated by reference. A PCED message may include, inter alia, the address of the PCE, and indications of PCE capabilities, such as the ability to compute local paths, inter-area paths, inter-AS paths, multi-domain paths, diverse paths, etc. Knowledge of other PCE addresses may be acquired by way of static configuration or other means as could be readily devised by one of skill in the art.

The path computation request (and response) between PCC and PCE can be exchanged in accordance with a protocol specified in Vasseur, et al. *RSVP Path Computation Request and Reply Messages*, Internet Draft, July 2004, which is hereby incorporated by reference as though fully set forth herein. It should be understood that the use of RSVP serves only as an example, and that other communication protocols may be used in accordance with the present invention.

The present invention is directed to a technique for triggering optimization of a TE-LSP that spans multiple domains of a computer network from a head-end node of a local domain to a tail-end node of a remote domain. The novel inter-domain TE-LSP optimization triggering technique is based on the detection of an event in the remote domain ("event domain") that could create a more optimal TE-LSP, such as, e.g., restoration of a network element or a configurable amount of increased available bandwidth. Specifically, a PCE in the event domain learns of the event and notifies PCEs for other domains of the event through an event notification. These PCEs then flood an event notification to LSRs in their respective domains. Upon receiving the notification and determining that it is a head-end node of one or more TE-LSPs (or pending TE-LSPs), the LSR responds to the PCE of its domain by issuing an optimization request for the one or more TE-LSPs. The PCE, in turn, determines whether a particular TE-LSP may benefit from optimization based on the event domain (i.e., whether the TE-LSP passes through or terminates at the event domain), and processes the request accordingly.

Figure 4:
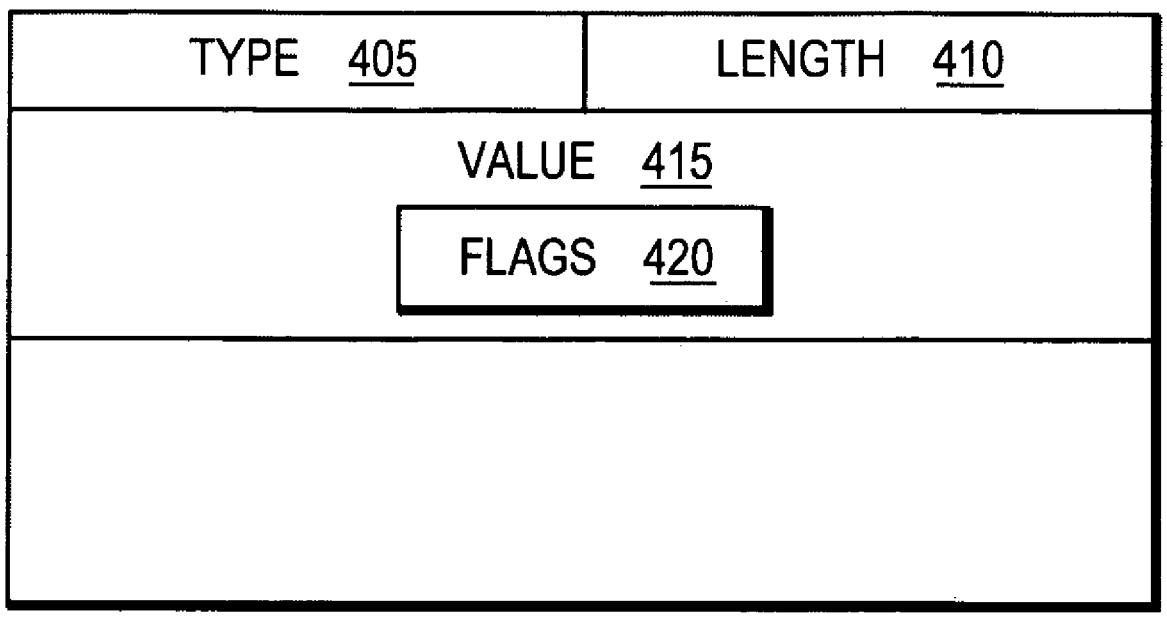
FIG. 4 is a schematic block diagram illustrating the format of an IGP Extension Object that may be advantageously used with the present invention.

In the illustrative embodiment described herein, the event notification is transmitted using IGP messages. Each PCE may create an IGP message that is used to propagate ("advertise") the event notification to other PCEs or LSRs in its domain, e.g., its IGP area/level. The PCE is illustratively embodied as an area border router or a level 1/level 2 router and the IGP message is embodied as an Open Shortest Path First (OSPF) or Intermediate-System-to-Intermediate-System (IS-IS) advertisement message ("IGP Advertisement 300"), respectively. Notably, the IGP Advertisement 300 includes a type/length/value (TLV) encoded format used to convey the event notification, such as IGP Extension Object 400. FIG. 4 is a schematic block diagram illustrating an IGP Extension Object 400 encoded using a TLV that may be advantageously used with the present invention. The TLV encoding format is a general way to communicate information between nodes, such as routers. The TLV "attribute" 400 is used to identify a type (T) of information being communicated (conveyed), a length (L) of information to be conveyed and a value (V) of the actual information conveyed. The length (L) parameter contained in the length field 410 is typically implementation-specific and can denote the length from the beginning of the Type field 405 of the attribute 400 to the end. However, the length generally denotes the length of the Value (V) field 415 and not the Type (T) or Length (L) fields. Flags field 420 may include any number of flags indicating various information, including, e.g., an event notification as described herein. The TLV encoded format may also comprise one or more non-ordered sub-TLVs (not shown) carried within the TLV "payload" (e.g. Value field 415), each having a Type, Length, and Value field.

In accordance with one aspect of the present invention, a PCE in the event domain ("event PCE") learns of an event through conventional notification means, e.g., the IGP Advertisements. The event may be a restoration of a TE-enabled network element, such as a new or restored link, or increased available bandwidth over a link that is determined (configured) to be sufficient to merit an event (e.g., over 50 Mb of freed/available bandwidth). Notably, these events are learned by the event PCE through known TE Extensions (e.g., utilizing the IGP Extension Object 400). Specifically, the TE Extensions transmit, inter alia, network element status, bandwidth over certain links, etc. TE Extensions are further described in previously-incorporated RFC 3630 (OSPF opaque LSAs) and RFC 3784 (IS-IS LSPs). Referring back to FIG. 1 for an example, an event may be the reappearance of a previously failed link between node n1 and n2 (dashed line) in A2 (event domain), where the traffic had been rerouted over the links n1-n3-n2 to avoid the failure. Nodes n1 and n2 each send an IGP Advertisement that includes the new link n1-n2, which are then received by ABR3 (event PCE).

The event PCE notifies other PCEs of the event through the event notification (e.g., the TLV encoded IGP Extension Object 400), which is illustratively contained within the IGP Advertisement 300. The event notification as a TLV encoded object includes an identifying type value, a variable length, and a set of flags 420 within Value field 415 that are used to convey the notification of the event. For instance, a single flag may be used to indicate an event-driven optimization trigger in a remote domain (to generalize events), or a separate flag for a new/repaired link or a configured increase in bandwidth could also be used in accordance with the present invention. Any number of flags or other indicating means may be contained with Value field 415, and the flags described herein are merely an illustrative example. In addition to flags 420, Value field 415 may contain other information useful to the present invention, such as, e.g., the amount of freed available bandwidth. Notably, an event notification that only utilizes flags 420 generally contains notification that an event has occurred (e.g., restoration of a link), and not which event specifically (e.g., restoration of link n1-n2). Those skilled in the art will understand that the event notification can be a stand-alone IGP Extension Object 400, or it may be included within fields of another extension object, particularly within a sub-TLV.

Notably, the event PCE may be configured to determine whether the event notification is beneficial enough to send to the other PCEs. Specifically, the event PCE examines the new/restored link and/or the available bandwidth increase and decides whether the event merits being sent as a notification. For example, a new link may appear in the event domain, but that link may only have a very small amount of free bandwidth, e.g., 1 MB, in which case, the event PCE may be configured to ignore the event. Other decision algorithms are also possible, as will be understood by those skilled in the art, such as always notifying other PCEs of a new/restored link, while limiting notification of freed bandwidth to bandwidth that is above a certain level.

The event PCE may also utilize a dampening algorithm, (e.g., exponential backoff, exponential delay, etc.) to limit the number and frequency of event notifications, thereby reducing the number of optimization requests. Dampening algorithms are known to those skilled in the art, and are generally used to change the amount of delay between an event occurring and the reporting of the event based on the frequency at which the event occurs. This is particularly useful when a link is continuously appearing as available and unavailable ("flapping"). Those skilled in the art will understand that while the event notifications may be dampened, this does not imply that conventional IGP Advertisements (e.g., for IP routing) are dampened, which continuously report the flapping link.

In accordance with another aspect of the present invention, a PCE receiving the event notification determines whether the event notification creates an optimization opportunity for LSRs in its domain, and if so, floods event notifications to its domain. Illustratively, the event notification here is configured in the same manner as described in more detail above. To establish whether an optimization opportunity exists, the receiving PCE, if configured to keep track of known TE-LSPs (and their current state) originating from its domain, inspects those TE-LSPs (or requests for TE-LSPs) to determine if any TE-LSPs utilize the event domain (e.g., pass through or terminate at the event domain). Also, the PCE may be configured to check if any of those TE-LSPs would benefit from the amount of bandwidth freed if the event is only an increase in bandwidth (e.g., where all TE-LSPs utilize 1 GB of bandwidth, and the amount freed is less than 50 MB). Notably, the receiving PCE stores identification of the event PCE, based on the advertising node field 302, in memory 240 for referencing which PCEs have advertised events, as described in more detail below.

If multiple event notifications are received from multiple event PCEs in the same domain, the PCE may be configured to disregard duplicate notifications. For example, if ABR3 and ABR4 forward notifications to ABR1, ABR1 acts on one (e.g., the first) received notification (e.g., from ABR3), and not on the subsequent notification (e.g., from ABR4). However, it should be noted that the PCE may determine if the subsequent notification from the same event domain, i.e., for a different event, should be distributed based on whether the event provides more opportunity for optimization (e.g., more available bandwidth than the first notification). Moreover, the receiving PCE may also be configured to limit the transmission of the notification if it is configured to keep track of past TE-LSP requests from LSRs. If no LSR in the domain of the PCE has requested a TE-LSP, the PCE need not forward the event notification. For instance, if ABR6 receives a notification from ABR3 of an event in A2, ABR6 may know that no LSR (e.g., routers D and E) its domain A4 has requested a TE-LSP to event domain A2. Notably, however, if an LSR (e.g., router D) has requested a TE-LSP to domain A2, but was not granted one (e.g., not enough bandwidth), ABR6 may forward the message to its domain.

If an LSR that receives the notification is a head-end node for one or more TE-LSPs or is otherwise attempting to establish a TE-LSP, the LSR/head-end node sends a conventional re-optimization request or a new path computation request, respectively (generally, an "optimization request") to the PCE in its domain ("source PCE") for the one or more TE-LSPs. For example, if ABR6 sends a notification to router E in A4, which is not a head-end node (i.e., does not have any configured TE-LSPs), router E will not send a optimization request. Optionally, a head-end node may be configured to determine a response to the event notification based on a number of factors. For instance, a head-end node may be configured to ignore all event notifications, or to respond to them all. Also, they may selectively choose for which TE-LSPs to request an optimization, such as based on policy, e.g., Voice over IP (VoIP) TE-LSPs, but not data TE-LSPs, or based on the amount of freed bandwidth, e.g., a OMB TE-LSP, but not a 1 GB TE-LSP, if 50 MB has been freed. Notably, head-end nodes may send a optimization request to their local PCE not considering whether the TE-LSP would benefit from the particular event domain, but instead based on the fact that an event occurred in a remote domain.

The sending of optimization requests may be jittered, i.e., delayed for a randomly-selected time, (e.g., between 0.0 and 2.0 seconds) in order to reduce congestion caused by multiple optimization requests that are substantially simultaneous. Specifically, a head-end node that wishes to send an optimization request will first randomly select a delay from a configurable range, and it must wait for the delay to expire before sending the request. In this way, the source PCE is not inundated with a burst of optimization requests from the LSRs in its area.

Upon receiving the request for a particular TE-LSP, the source PCE, if configured, determines whether the TE-LSP passes through or terminates at the event domain by comparing the event PCE (e.g., based on the stored advertising node 302 values for event PCEs) with the PCE to which the source PCE would forward the optimization request. If the TE-LSP uses the event domain, the PCE processes the request. If, however, the TE-LSP does not use the event domain (i.e., terminates in a different remote domain), the source PCE may reject the request and return an error message. For example, ABR1 has sent a notification to router A. If router A sends an optimization request to ABR1 for a TE-LSP from A in A1 to C in A3, the ABR1 rejects the request because this TE-LSP would not benefit from optimization based on the event domain. Also, the source PCE may be configured to make the above determination only for a certain time delay, and to honor all optimization requests thereafter. Particularly, if a head-end node is requesting regularly-scheduled optimization according to a timer-based trigger, it may be undesirable to reject such a request. Furthermore, those skilled in the art will understand that multiple domains may be event domains, and that a TE-LSP optimization request need not use the most recent event domain, but any event domain still stored as such in the local memory of the source PCE.

Referring again to FIG. 1, assume that all routers A, C, and D have received an event notification for event domain A2. If router A sends an optimization request to ABR1 for a TE-LSP from router A to router B in A2, this request is processed because it terminates in the event domain A2. Ultimately, this request will produce an optimization, assuming the new/restored link n1-n2 is a more optimal path (and satisfies any required constraints). Conversely, if router C sends an optimization request to ABR5 for a TE-LSP from router C to router B in A2, this request is also processed because of the event domain. However, this request will not result in an optimization, assuming that the optimal path remains through n4, and not link n1-n2.

Figure 5:
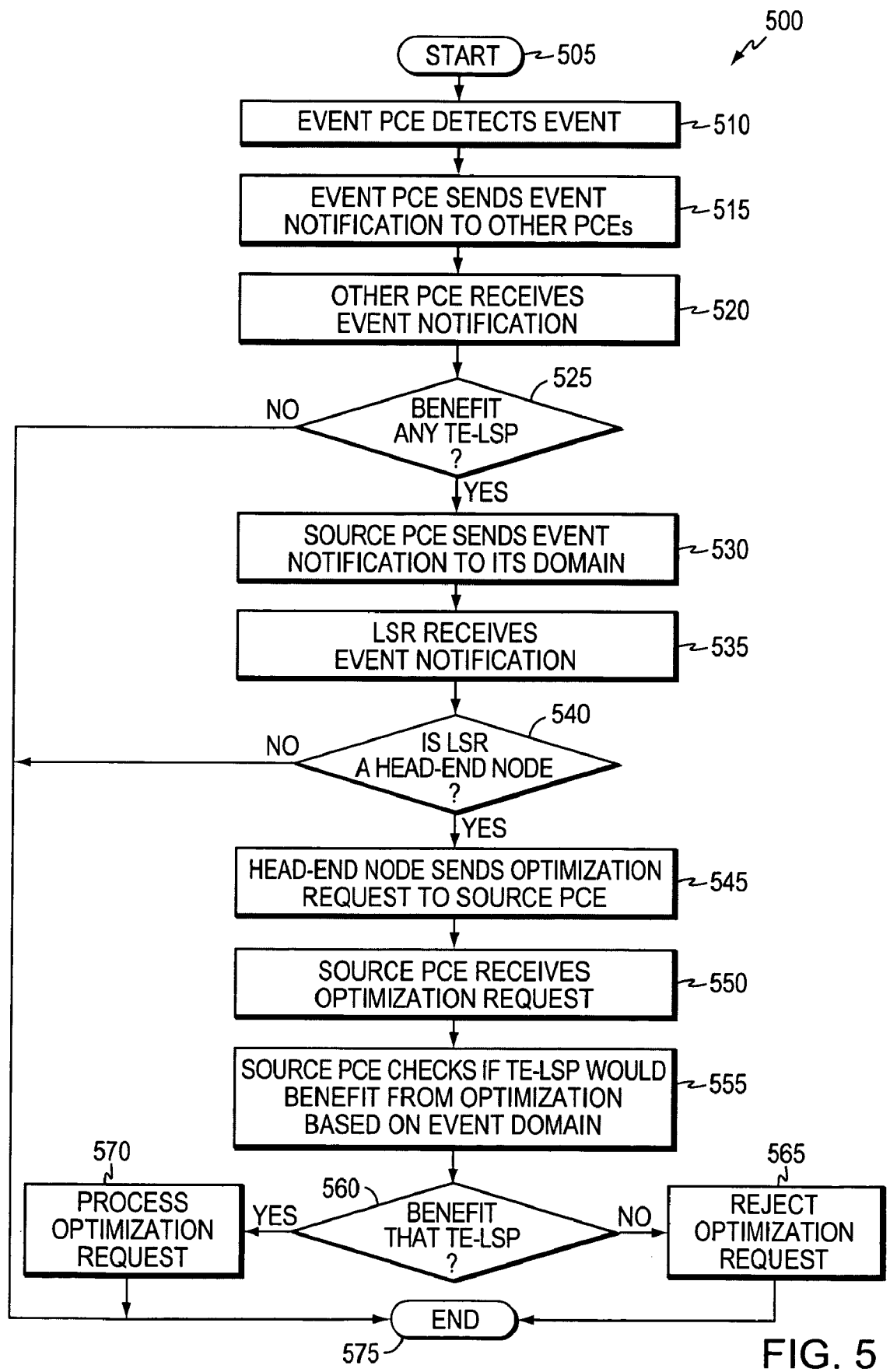
FIG. 5 is a flowchart illustrating a sequence of steps for triggering optimization in accordance with the present invention.

FIG. 5 is a flowchart illustrating a sequence of steps for triggering optimization in accordance with the present invention. Sequence 500 starts at step 505 and continues to step 510 where the event PCE (e.g., ABR3) detects the event, such as, e.g., through an IGP Advertisement (e.g., for the appearance of link n1-n2). In step 515, the event PCE sends the event notification to the other PCEs (ABR1-6, except ABR3) through the use of IGP Extension Object 400. Notably, the event PCE may first decide whether it is beneficial to send the request.

At step 520, the other PCEs receive the event notification. If configured to do so, in step 525 the receiving PCE may determine whether any LSRs in its domain have requested a TE-LSP that would benefit from the event. If not, the sequence ends at step 575. Otherwise, the sequence continues to step 530, where the PCE (a source PCE) sends the event notification to the LSRs in its domain. An LSR receives the notification in step 535, and if it is not a head-end node at step 540, the LSR ignores the notification (aside from perhaps forwarding it on to other LSRs in its domain), and the sequence ends at step 575. If the LSR is a head end node, it sends an optimization request (optionally jittered) to its local source PCE in step 545. Notably, the head-end node may first determine for which TE-LSPs, if any, to send an optimization request, as described above.

The source PCE receives the optimization request in step 550, and in step 555 it checks if the TE-LSP in the request would benefit from optimization based on the event domain. If there would be no benefit in step 560, the source PCE rejects the request, sends an error message to the requesting head-end node, and the sequence ends in step 575. However, if at step 560 it is determined that the TE-LSP could benefit from optimization, the source PCE processes the received optimization request. Once the request is processed, the sequence ends in step 575.

Advantageously, the novel technique triggers optimization of a TE-LSP that spans multiple domains based on events occurring in remote domains. By informing the head-end node in a source domain of the event (an optimization opportunity) in a remote domain, the inventive technique provides a mechanism for efficiently triggering the request for optimization of a multi-domain TE-LSP when an event occurs that could allow for a more optimal path, as opposed to relying on a sub-optimal timer-based trigger.

While there has been shown and described an illustrative embodiment that triggers optimization of inter-domain TE-LSPs at a head-end node of the TE-LSP, it is to be understood that various other adaptations and modifications may be made within the spirit and scope of the present invention. For example, while the above description describes the domains in terms of areas/levels, the invention may also be advantageously used with ASes under applicable circumstances. Alternatively, through modifications to the teachings described herein and/or additional processing, those skilled in the art will understand that the present invention may be adapted for use with ASes generally. Also, while the above description describes the communication between PCEs to be through IGP Advertisements, those skilled in the art will understand that other communication means between PCEs may be available, such as a distinct PCE signaling exchange. In this case, the event PCE could limit transmission of event notifications to those PCEs that have recently sent TE-LSP requests. Also, with distinct PCE signaling the event PCE may limit sending the notification to multiple PCEs of the same domain. Notably, the invention has been shown and described herein using nomenclature such as "optimizing," which may appear to be specific to implementations of the invention providing re-optimization of an established TE-LSP. However, the invention in its broader sense is not so limited, and may, in fact, be used to optimize a TE-LSP pending establishment because of an inability of the network topology to meet constraints prior to the event.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method for triggering optimization of a traffic engineering (TE) label switched path (LSP) that spans multiple domains of a computer network from a head-end node of a local domain to a tail-end node of a remote domain, the method comprising:

detecting, at an event path computation element (PCE), an event in the remote domain ("event domain") that provides an additional link or additional bandwidth on an existing link for use with TE-LSPs;

notifying, as a notification from the event PCE, one or more other PCEs for other domains of the event in the event domain;

receiving the notification at the one or more other PCEs;

determining, at the one or more other PCEs, whether any TE-LSPs originating in respective other domains of the one or more other PCEs would benefit from optimization based on the event in the event domain; and provided that at least one TE-LSP in each of the respective other domains of the one or more other PCEs would benefit, flooding, from the one or more other PCEs, the notification to one or more label switched routers (LSRs) in the respective other domains of the one or more other PCEs, thereby triggering an optimization request for one or more TE-LSPs from the one or more LSRs, the optimization request to cause use of at least a portion of the additional link or bandwidth by the one or more TE-LSPs.

2. The method as in claim 1, further comprising:

sending, from the one or more LSRs, one or more optimization requests for one or more TE-LSPs to the one or more other PCEs;

receiving, at the one or more other PCEs, the one or more optimization requests; and processing, at the one or more other PCEs, the one or more optimization requests.

3. The method as in claim 2, further comprising: determining whether the TE-LSP of one of the one or more optimization requests would benefit from optimization based on the event domain prior to processing the one optimization request.

4. The method as in claim 2, wherein the optimization requests are jittered.

5. The method as in claim 1, wherein the event is selected from a group consisting of: a new link, a restored link, and a configured increase of available bandwidth.

6. The method as in claim 1, further comprising: utilizing extensions to an IGP Advertisement to send and flood the notification.

7. The method as in claim 1, further comprising: disregarding, at the one or more other PCEs, duplicate notifications.

8. The method as in claim 1, further comprising: dampening, at the event PCE, the notifying of the notification.

9. A system for triggering optimization of a traffic engineering (TE) label switched path (LSP) that spans multiple domains of a computer network from a head-end node of a local domain to a tail-end node of a remote domain, the system comprising:

an event path computation element (PCE) configured to detect an event in the remote domain ("event domain") that provides an additional link or additional bandwidth on an existing link for use with TE-LSPs;

a notification of the event, sent from the event PCE;

one or more other PCEs for other domains configured to receive the notification, determine whether any TE-LSPs originating in respective other domains of the one or more other PCEs would benefit from optimization based on the event and provided that at least one TE-LSP in each of the respective other domains of the one or more other PCEs would benefit, flood the notification in the respective other domains of the one or more other PCEs; and one or more label switched routers (LSRs) in the respective other domains of the one or more other PCEs configured to receive the flooded notification, and to thereby trigger an optimization request for one or more TE-LSPs, the optimization request to cause use of at least a portion of the additional link or bandwidth by the one or more TE-LSPs.

10. The system as in claim 9, wherein the one or more LSRs are further configured to send one or more optimization requests for one or more TE-LSPs to the one or more other PCEs for processing.

11. The system as in claim 10, wherein the one or more other PCEs are configured to determine whether the TE-LSP of one of the one or more optimization requests would benefit from optimization based on the event domain prior to processing the one optimization request.

12. The system as in claim 10, wherein the one or more LSRs are further configured to jitter the optimization requests.

13. The system as in claim 9, wherein the event is selected from a group consisting of: a new link, a restored link, and a configured increase of available bandwidth.

14. The system as in claim 9, further comprising: extensions to an IGP Advertisement containing the notification.

15. The system as in claim 9, further comprising: a dampening system at the event PCE configured to dampen the notification of the event.

16. A node for use with triggering optimization of a traffic engineering (TE) label switched path (LSP) that spans multiple domains of a computer network from a head-end node of a local domain to a tail-end node of a remote domain, the node comprising:

a network interface to receive and send a notification of an event in a remote domain ("event domain") that provides an additional link or additional bandwidth on an existing link for use with TE-LSPs;

a processor coupled to the network interface and adapted to execute software processes; and a memory adapted to store a path computation element (PCE) process executable by the processor, the PCE process configured to i) if the node is in the event domain, notify one or more other PCEs for other domains of the event; and ii) if the node is in the local domain, determine whether any TE-LSPs originating in the local domain would benefit from optimization based on the event and provided that at least one TE-LSP in the local domain would benefit, flood the notification to one or more label switched routers (LSRs) in the local domain, thereby triggering an optimization request from the one or more LSRs, the optimization request to cause use of at least a portion of the additional link or bandwidth.

17. The node as in claim 16, wherein the event is selected from a group consisting of: a new link, a restored link, and a configured increase of available bandwidth.

18. The node as in claim 16, wherein the PCE process utilizes extensions to an IGP Advertisement to flood the notification.

19. A method comprising:

receiving, at a path computation element (PCE) of a local domain, a notification of an event in a remote domain ("event domain") from a PCE of the event domain, the notification indicating that an additional link or additional bandwidth on an existing link is available for use with traffic engineering (TE) label switched paths (LSPs);

determining, at the PCE of the local domain, whether any TE-LSPs originating from the local domain would benefit from optimization based on the event; and provided that at least one TE-LSP would benefit, flooding the notification to one or more label switched routers (LSRs) in the local domain to trigger the one or more LSRs to send a TE-LSP optimization request that causes use of at least a portion of the additional link or bandwidth by the at least one TE-LSP.

20. The method as in claim 19, wherein the event is selected from a group consisting of: a new link, a restored link, and a configured increase of available bandwidth.

21. The method as in claim 19, further comprising:
utilizing extensions to an IGP Advertisement to send and flood the notification.

22. The method as in claim 19, further comprising:
maintaining, at the PCE of the local domain, a record of TE-LSPs originating from the local domain and current state of those TE-LSPs, and
wherein the determining uses the record to determine whether any TE-LSPs originating from the local domain would benefit from optimization based on the event.

* * * * *

UNITED STATES PATENT AND TRADEMARK OFFICE
CERTIFICATE OF CORRECTION

PATENT NO. : 7,684,351 B2 Page 1 of 1
APPLICATION NO. : 11/052280
DATED : March 23, 2010
INVENTOR(S) : Jean-Philippe Vasseur It is certified that error appears in the above-identified patent and that said Letters Patent is hereby corrected as shown below:

Col. 6, Line 37, please amend as shown:

switched routers[[ (LSRS)]] LSRs in their respective domains. Upon

Col. 6, Line 42, please amend as shown:

request for the one or more[[ TE-LSPS]] TE-LSPs. The PCE, in turn,

Col. 13, Line 59, please amend as shown:

based on the amount of freed bandwidth, e.g., a[[ OMB TE-]] 10MB TE-

Signed and Sealed this

Seventeenth Day of August, 2010

David J. Kappos
*Director of the United States Patent and Trademark Office*